(12) United States Patent
Klör et al.

(10) Patent No.: US 6,497,010 B1
(45) Date of Patent: Dec. 24, 2002

(54) SPRING BAND CLAMP BLOCK

(75) Inventors: Stefan Klör, Olpe (DE); Hans Neukirch, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 2 days.

(21) Appl. No.: 09/732,932

(22) Filed: Dec. 11, 2000

(30) Foreign Application Priority Data

May 15, 2000 (DE) .......................................... 100 23 607
Jul. 3, 2000 (DE) .......................................... 100 31 000

(51) Int. Cl.[7] .......................... A44B 21/00; B65D 63/00; F16L 33/02
(52) U.S. Cl. ..................... 24/20 R; 24/20 S; 24/20 EE; 24/306; 24/339
(58) Field of Search ............................... 24/20 R, 20 S, 24/20 CW, 20 EE, 21, 28, 284, 339, 306

(56) References Cited

U.S. PATENT DOCUMENTS

| | | | |
|---|---|---|---|
| 1,026,050 A | | 5/1912 | Reber et al. |
| 1,654,340 A | * | 12/1927 | McIntosh ..................... 403/274 |
| 1,906,874 A | * | 5/1933 | Platt .............................. 24/457 |
| 2,232,994 A | | 2/1941 | Bernstein |
| 2,413,772 A | * | 1/1947 | Morehouse ................ 243/20 R |
| 3,118,207 A | * | 1/1964 | Breslow ........................ 24/304 |
| 3,542,321 A | * | 11/1970 | Kahabka ....................... 248/68 |
| 3,563,131 A | * | 2/1971 | Ridley, Sr. .................... 248/68 |
| 4,306,697 A | * | 12/1981 | Mathews ................ 248/68 CB |
| 4,457,053 A | * | 7/1984 | Niwa ........................... 24/304 |
| 4,773,129 A | | 9/1988 | Muhr |
| 4,791,014 A | | 12/1988 | West |
| 4,930,192 A | | 6/1990 | Muhr |
| 5,507,460 A | * | 4/1996 | Schneider ................. 24/601.2 |
| 5,524,327 A | * | 6/1996 | Mickel et al. ............. 24/115 A |
| 5,577,302 A | * | 11/1996 | Bortle .......................... 24/306 |
| 6,061,880 A | * | 5/2000 | Senninger .................... 24/339 |
| 6,098,251 A | * | 8/2000 | Zielinski ..................... 24/20 R |

* cited by examiner

Primary Examiner—Victor Sakran
(74) Attorney, Agent, or Firm—Nixon Peabody LLP; David S. Safran

(57) ABSTRACT

A spring band clamp block formed of a plurality of spring band clamps (1), each of which has a spring band (2) and two projecting tensioning ends (3, 4), and which are detachably joined to one another by means of a fastener. The spring band clamp block can be built especially easily for all types of spring band clamps (1) by the spring band clamps (1) being joined to one another, preferably, by means of at least two adhesive strips (5, 6). The adhesive strips (5, 6) are arranged on the spring bands (2), parallel to the lengthwise axis (7) of the spring band clamps (1), and preferably in the vicinity of the projecting tensioning ends (3, 4).

14 Claims, 3 Drawing Sheets

SPRING BAND CLAMP BLOCK

BACKGROUND OF THE INVENTION

1. Field of the Invention

The invention relates to a spring band clamp block consisting of a plurality of spring band clamps, the spring band clamps having a spring band and two projecting tensioning ends.

2. Description of Related Art

Spring band clamps have been known for years in various embodiments (see, U.S. Pat. Nos. 4,773,129 and 4,930,192). With these spring band clamps, for example, a pressure-tight seat of hose ends on the pipe unions of the cooling system of a motor vehicle engine is ensured. These spring band clamps in the untensioned state—clamping state—have a certain inside diameter and can be spread to a much greater diameter using a tensioning tool which engages the tensioning ends against the spring force of the spring band—the spread state in which the spring band clamp then has an inside diameter which is greater than the outside diameter of the hose end, and thus, can be easily moved over the hose end which can be turned onto one pipe union as far as the respective installation site. The pressure-tight seat of one hose end on the pipe union is, on the one hand, ensured by the inherent elasticity of the hose end itself, and on the other hand, by the spring force of the spring band clamp, i.e., of the spring band of the spring band clamp.

The spring band clamps are produced in different sizes and versions in large numbers and are used especially in the motor vehicle industry in especially large numbers, being supplied by manufacturers to the motor vehicle industry in cartons of, for example, 50, 100 or 500. The installer then takes each individual spring band clamp from the carton as needed, spreads the spring band clamp with a corresponding installation tool and carries the spring band clamp in this way to the respective installation site. Since this process is repeated hundreds of times a day, it is desirable to make the individual spring band clamps available such that the installer can grasp them as directly as possible with the corresponding installation tool. To do this, holding devices are produced onto which a certain number of spring band clamps can be slipped—the spring band clamps can therefore be more or less magazined so that the spring band clamps can then be grasped by the installer directly with the installation tool from a pre-defined position. The disadvantage here is that, on the one hand, time necessary for magazining, and on the other hand, for different spring band clamps, especially for spring band clamps with different diameters, different holding devices are needed.

SUMMARY OF THE INVENTION

An object of the invention is to join several spring band clamps to one another in a severable manner, i.e., to magazine them or make them available in the form of a spring band clamp block, such that it is possible to provide the individual spring band clamps in a position which is as favorable as possible for installation.

The aforementioned object is achieved, first of all, essentially in that the spring band clamps are detachably joined to one another by a fastener.

The use of a fastener which detachably joins the individual spring band clamps to one another in accordance with the invention especially easily, economically, and thus, effectively accomplishes magazining of spring band clamps, i.e., forms a spring band clamp block so that a host of spring band clamps can be made available to the installer all at once in a position as optimum as possible for installation.

In particular, there are various possibilities for building the fastener for the spring band clamp block according to the invention.

In the first preferred embodiment of the spring band clamp block in accordance with the invention, at least one adhesive strip is used as the fastener. Preferably however, there are two adhesive strips and the adhesive strips are located lengthwise to the axis of the spring band clamps on the spring band. Because the adhesive strips are located at a distance from each other, preferably in the vicinity of the projecting tensioning ends, when using adhesive strips of an inherently very flexible material, a very stable and torsionally-stiff spring band clamp block is achieved. The spring band clamp block according to the invention can, moreover, be built independently of the embodiment and the diameter of the individual spring band clamps with minimum cost. The stability of the spring band clamp block is then especially great when, if two adhesive strips are used, they are located offset by roughly 180° relative to one another on the spring band. This arrangement of the adhesive strips prevents unintentional tilting of the spring band clamp block apart transversely to its lengthwise axis; this would occur if only one single adhesive strip were used or two adhesive strips directly next to one another were used.

To separate the individual spring band clamps from the spring band clamp block, i.e., to detach the individual spring band clamps from the adhesive strips, it is advantageous if the adhesive strip or strips projects or project on one side beyond the end of the spring band clamp block. Then, the adhesive strip or strips can be easily withdrawn from the spring band clamp block by an installer after the spring band clamp block has been inserted into a corresponding holding device. Alternatively or additionally to the aforementioned measure, the adhesive strip or strips can be perforated in the transition area between two spring band clamps transversely to the lengthwise direction of the adhesive strip. In this way, it is then possible to detach an individual spring band clamp from a spring band clamp block without the need to withdraw the adhesive strips or strips completely from the block of spring band clamps. This is advantageous when the spring band clamp block is not set in a corresponding holding device or receiver which is designed to prevent the individual spring band clamps from falling apart after the adhesive strip is removed from the spring band clamp block. When using a perforated adhesive strip or strips, individual spring band clamps can be detached from the spring band clamp block without the remaining spring band clamps falling apart.

Embodiments of the spring band clamp block in accordance with the invention have been described which share, in particular, the fact that there is at least one adhesive strip as the fastener. However, there are also various other possibilities for embodying the fastener of the spring band clamp block according to the invention.

One embodiment of the spring band clamp block in accordance with the invention which is fundamentally different from the above described embodiments has as the fastener, a connecting clip which joins the individual spring band clamps to one another and which can preferably be made like a comb.

In still other embodiments of a spring band clamp block according to the invention, as the fastener, there is an adhesive between the individual spring band clamps which joins the latter to one another.

In particular, there are now a host of possibilities for embodying the spring band clamp block in accordance with the invention, especially the exact arrangement and dimensions of the adhesive strips.

The invention is explained below using three preferred embodiments shown by the drawings.

DETAILED DESCRIPTION OF THE INVENTION

The figures show a spring band clamp block comprised of seven or nine spring band clamps 1, each spring band clamp 1 having a spring band 2 and two projecting tensioning ends 3, 4. The individual spring band clamps 1 are combined into a spring band clamp block in accordance with the invention by the spring band clamps 1 being detachably joined to one another by means of a fastener. It should be appreciated that the particular spring band clamps 1 shown are merely used as examples, the invention being applicable to any other spring band clamps that have an annular spring band and projecting tensioning ends and is not limited to the specific form of the spring band clamps shown.

Figure 1:
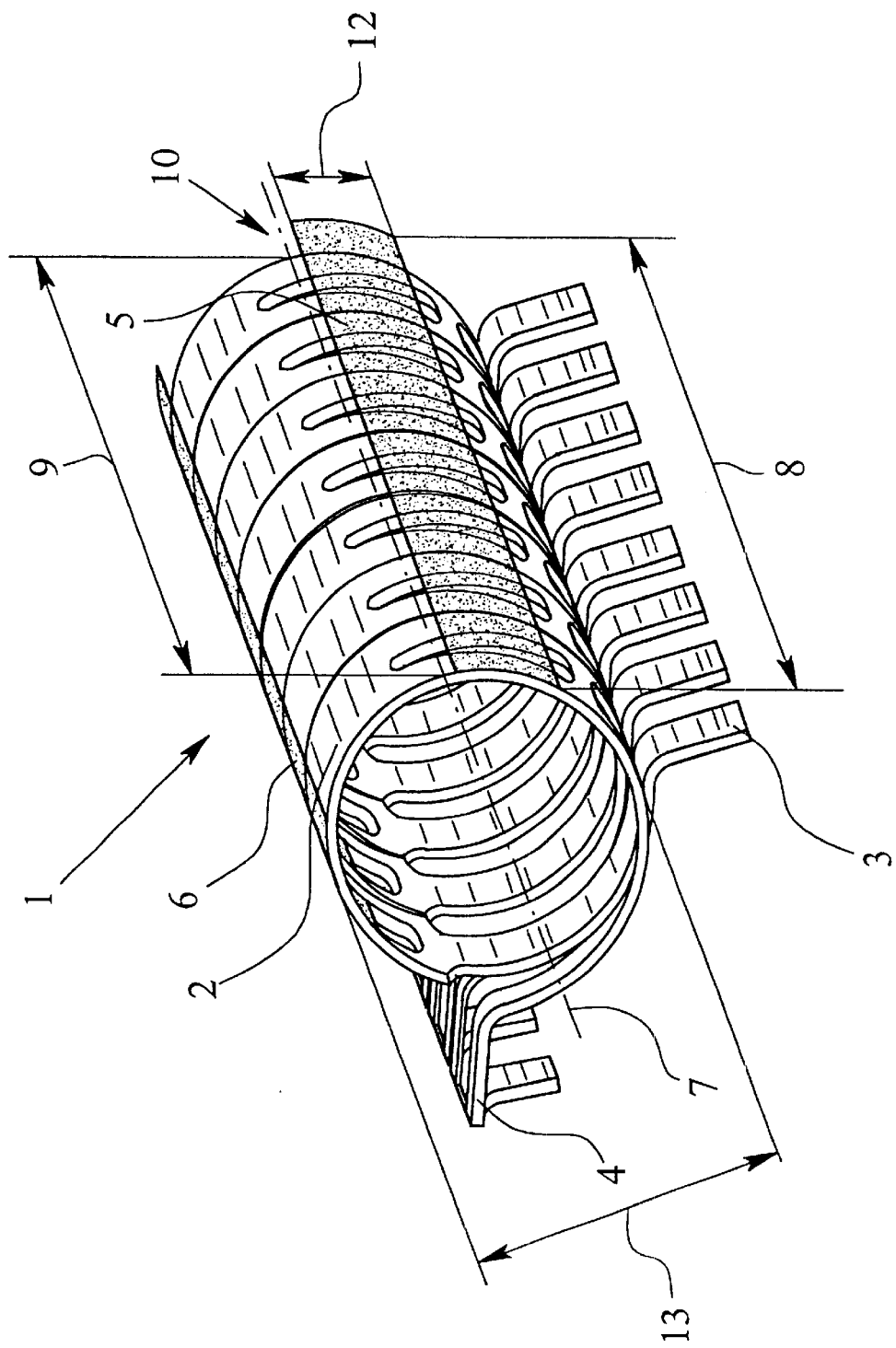
FIG. 1 is a perspective view of a spring band clamp block with two adhesive strips which project beyond one end of the spring band clamp block.

In the embodiment of a spring band clamp block according to the invention which is shown in FIG. 1, there are two adhesive strips 5, 6 as the fastener; the spring band clamps 1 are therefore joined to one another by means of the two adhesive strips 5, 6. The adhesive strips 5, 6 extend on the spring band 2 in the vicinity of the projecting tensioning ends 3, 4 lengthwise to the axis 7 of the spring band clamps 1. The two adhesive strips 5, 6 are offset by somewhat less than 180° relative to one another on the spring band 2.

In the spring band clamp block shown in FIG. 1, the length 8 of the adhesive strips 5, 6 is somewhat greater than the length 9 of the spring band clamp block. Thus, the adhesive strips 5, 6 project beyond one end 10 of the spring band clamp block. In this way, it is easily possible to detach the adhesive strips 5, 6 from the spring band clamp block. If the spring band clamp block has been inserted previously into a corresponding holding device or receiver, the adhesive strips 5, 6 can be withdrawn from all spring band clamps 1 before the start of installation of the individual spring band clamps 1, since the receiver or the holding device prevents the spring band clamps 1 from falling apart. If a receiver or holding device is not used, the individual spring band clamps 1 of the spring band clamp block can be prevented from falling apart by the adhesive strips 5, 6 only being withdrawn to the extent which corresponds to the length or the number of the spring band clamps 1 which are required.

Figure 2:
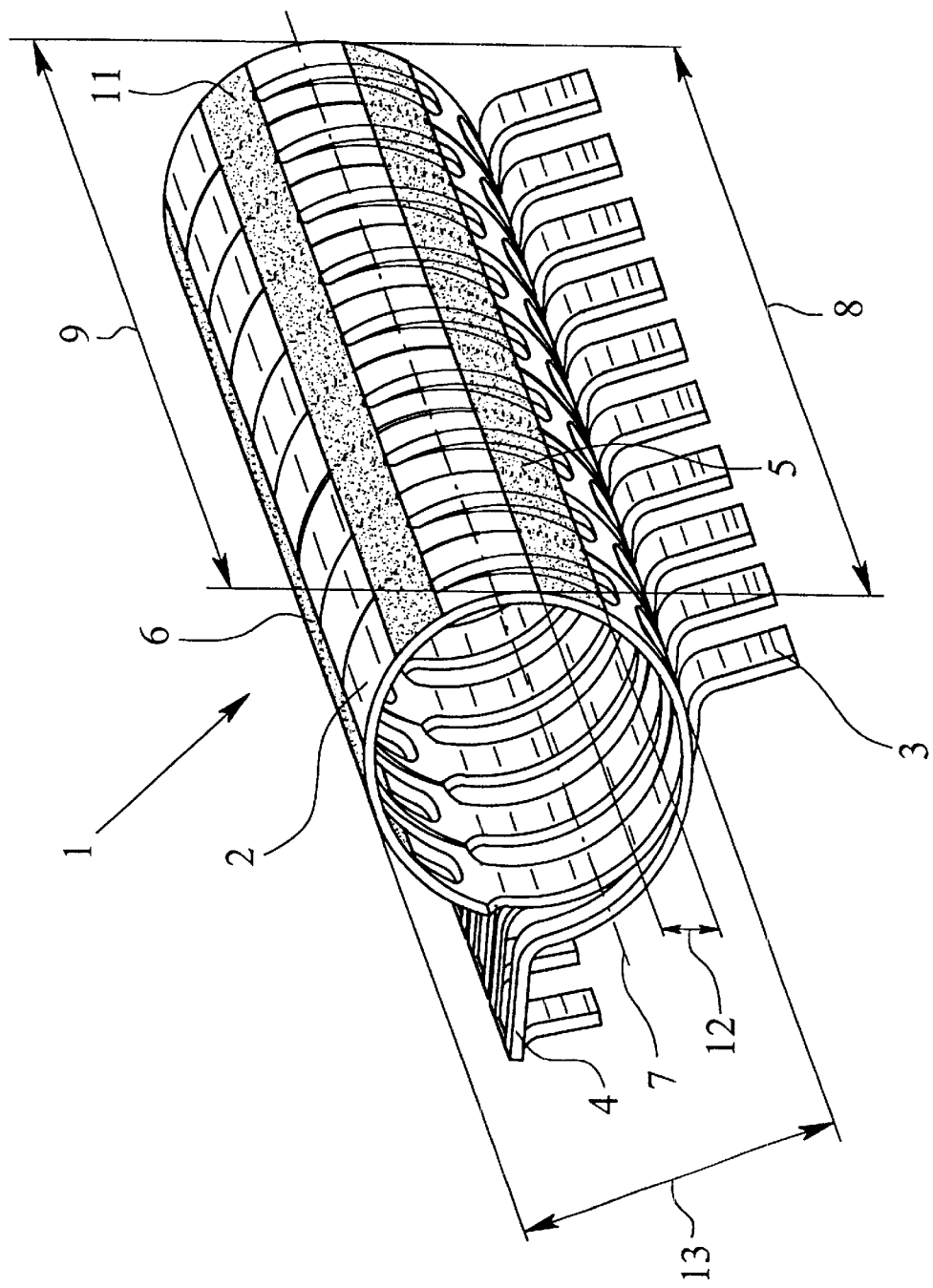
FIG. 2 is a perspective view of a spring band clamp block with three adhesive strips, the adhesive strips each being perforated transversely to the lengthwise direction.

In the spring band clamp block shown in FIG. 2, first of all, there are also two adhesive strips 5, 6 which are located somewhat more than 180° offset to one another. The two adhesive strips 5, 6 are therefore somewhat less distant from the projecting tensioning ends 3, 4 in the embodiment as shown in FIG. 2 than the two adhesive strips 5, 6 in the spring band clamp block as shown in FIG. 1.

Otherwise, on the one hand, the length 8 of the adhesive strips 5, 6 corresponds to the length 9 of the spring band clamp block, and on the other hand, the adhesive strips 5, 6 are perforated transversely to their lengthwise direction in the transition area between each adjacent pair of spring band clamps 1. Thus, here, the individual spring band clamps 1 can be separated from the spring band clamp block without having to remove the adhesive strips 5, 6 beforehand. To do this, the adhesive strips 5, 6 only need be separated at the already perforated sites.

In addition, the spring band clamp block which is shown in FIG. 2 differs from the spring band clamp block as shown in FIG. 1 only in that a third adhesive strip 11 is provided, for additional reinforcement, in the middle between the two adhesive strips 5, 6 which are located near the tensioning ends of the spring band 2. This adhesive strip 11 is also perforated in the embodiment as shown in FIG. 2. Of course, it is also possible to use three unperforated adhesive strips or in addition to the two perforated adhesive strips 5, 6 as shown in FIG. 2 to place a third unperforated adhesive strip in the middle between the two perforated adhesive strips 5, 6. In this combination the third, middle, unperforated adhesive strip could first hold together the spring band clamp block during transport and in the preparation of the spring band clamps 1, then could be removed after preparation of the spring band clamp block, and finally, the spring band clamps 1 needed for installation could be detached by simply tearing off from the remaining spring band clamp block based on the perforated adhesive strips 5, 6 still present. Of course any other combination of perforated and unperforated adhesive strips as well as use of more than three adhesives strips are also possible.

The width 12 of the adhesive strips 5, 6, 11 can be varied depending on the diameter of the spring band clamps 1. Generally, the width 12 of the adhesive strips 5, 6, 11 can be between $1/3$ and $2/3$ of the diameter 13 of the spring band clamps 1. Likewise, the thickness, and thus also the tear strength, of the adhesive strips 5, 6, 11 can be chosen depending on the size and weight of the individual spring band clamps 1 or the length of the spring band clamp block. For spring band clamps 1 as are used ordinarily in motor vehicles, generally, a commercial adhesive tape can be used. However, if necessary a reinforced adhesive tape can be used for the adhesive strips 5, 6 or for the adhesive strips 5, 6, 11.

Figures 3, 3A:
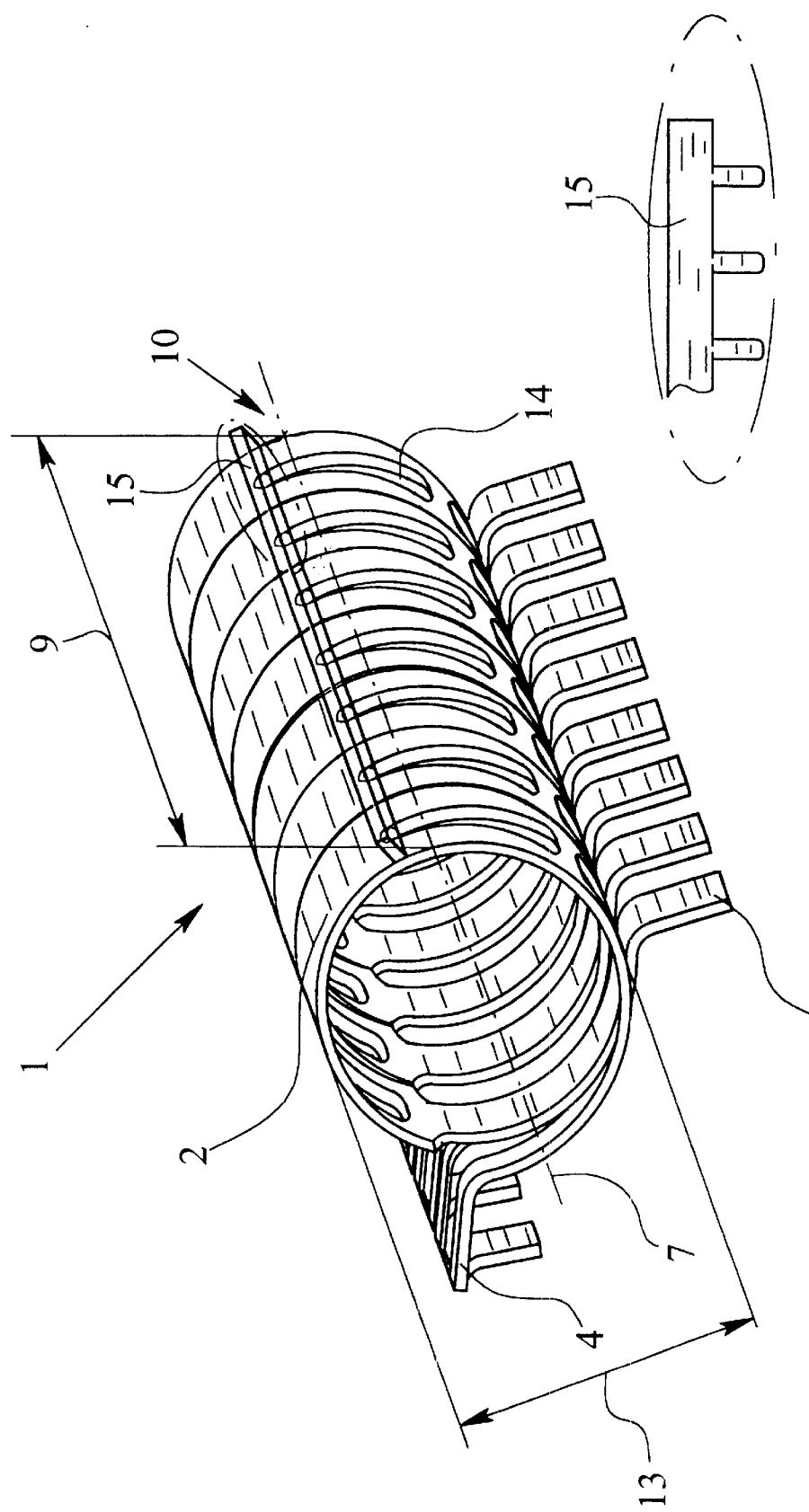
FIG. 3 is a perspective view of a spring band clamp block in which there is a connecting clip as the fastener.
FIG. 3A shows the encircled detail "A" of FIG. 3 on an enlarged scale.

In all embodiments, the spring bands 2 of the spring band clamps 1 have recesses 14, as is indicated especially in FIG. 3. Using this, the embodiment of a spring band clamp block in accordance with the invention which is shown in FIG. 3 is characterized in that a connecting clip 15 is used as the fastener that joins the individual spring band clamps 1 to one another. The connecting clip 15, as is especially clearly illustrated by the enlarged detail "A" in FIG. 3A, is made comb-like. Thus, the connecting clip 15 can fit into the recesses 14 in the spring bands 2 of the spring band clamps 1 and join the individual spring band clamps to one another in this way.

Finally, it should be pointed out that in the spring band clamp block according to the invention, an adhesive can be provided between the individual spring band clamps as the fastener which joins the individual spring band clamps to one another.

What is claimed is:

1. Spring band clamp block, comprising a plurality of individual spring band clamps, each of the spring band clamps having a spring band and two projecting tensioning ends; wherein the spring band clamps are detachably joined to one another by a fastener; wherein the fastener comprises an adhesive provided between the individual spring band clamps which joins the individual spring band clamps to one another.

2. Spring band clamp block, comprising a plurality of individual spring band clamps, each of the spring band clamps having a spring band and two projecting tensioning ends; wherein the spring band clamps are detachably joined to one another by a fastener wherein the fastener comprises at least two adhesive strips.

3. Spring band clamp block as claimed in claim 2, wherein each of the two adhesive strips is located in a vicinity of a respective one the two projecting tensioning ends of the spring band clamps.

4. Spring band clamp block as claimed in claim 2, wherein the adhesive strips are located offset relative to one another on the spring band by roughly 180°.

5. Spring band clamp block as claimed in claim 2, wherein the at least two adhesive strips have a length which exceeds that of the spring band clamp block.

6. Spring band clamp block as claimed in claim 5, wherein the at least one adhesive strip projects beyond an end of the spring band clamp block.

7. Spring band clamp block as claimed in claim 2, wherein the at least two adhesive strips are perforated transversely to a lengthwise direction of the adhesive strips in transition areas between pairs of adjacent spring band clamps.

8. Spring band clamp block as claimed in claim 2, wherein a third adhesive strip is provided in a middle area between the two adhesive strips for additional reinforcement of the spring band clamp block.

9. Spring band clamp block as claimed in claim 2, wherein the at least two adhesive strips have a width which is predetermined fraction of a diameter of the spring band clamps.

10. Spring band clamp block as claimed in claim 9, wherein said predetermined fraction of the diameter of the spring band clamps is between $1/3$ and $2/3$ of the diameter of the spring band clamps.

11. Spring band clamp block as claimed in claim 2, wherein the at least two adhesive strips are a commercial adhesive tape.

12. Spring band clamp block as claimed in claim 2, wherein the at least two adhesive strips are a reinforced adhesive tape.

13. Spring band clamp block, comprising a plurality of individual spring band clamps, each of the spring band clamps having a spring band and two projecting tensioning ends; wherein the spring band clamps are detachably joined to one another by a fastener; wherein the fastener is a connecting clip which spans the plurality of individual spring band clamps and detachably joins them to one another.

14. Spring band clamp block as claimed in claim 13, wherein the connecting clip is comb-shaped.

\* \* \* \* \*